(12) United States Patent
Zhao et al.

(10) Patent No.: US 12,543,160 B2
(45) Date of Patent: Feb. 3, 2026

(54) METHOD AND APPARATUS FOR WIRELESS COMMUNICATION

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/631,942

(22) Filed: Apr. 10, 2024

(65) Prior Publication Data

US 2024/0284425 A1 Aug. 22, 2024

Related U.S. Application Data

(63) Continuation of application No. PCT/CN2023/081857, filed on Mar. 16, 2023.

(30) Foreign Application Priority Data

Feb. 22, 2023 (CN) .......................... 202310151374.2

(51) Int. Cl.
*H04W 72/0453* (2023.01)
*H04W 24/10* (2009.01)
(Continued)

(52) U.S. Cl.
CPC ....... *H04W 72/0453* (2013.01); *H04W 24/10* (2013.01); *H04W 76/20* (2018.02); *H04W 76/30* (2018.02); *H04W 80/02* (2013.01)

(58) Field of Classification Search
CPC . H04W 28/20; H04W 72/0453; H04W 24/10; H04W 76/20; H04W 76/30; H04W 80/02; H04L 5/0078
(Continued)

(56) References Cited

U.S. PATENT DOCUMENTS

2020/0084011 A1* 3/2020 Li .......................... H04L 5/0098
2021/0028914 A1* 1/2021 Jin .......................... H04W 8/22
(Continued)

FOREIGN PATENT DOCUMENTS

CN 102264094 11/2011
CN 111565406 8/2020
(Continued)

OTHER PUBLICATIONS

International Search Report and Written Opinion in International Appln. No. PCT/CN2023/081857, mailed on Nov. 13, 2023, 15 pages (with English machine translation).
(Continued)

*Primary Examiner* — Mazda Sabouri
(74) *Attorney, Agent, or Firm* — Fish & Richardson P.C.

(57) ABSTRACT

The present disclosure provides a method and apparatus for wireless communication. One example method includes sending a first request by the terminal device. The first request comprises a request for a network device to reconfigure an operating frequency domain unit corresponding to the terminal device. The first request includes first information, and the first information includes at least one of the following configurations: adding at least one operating frequency domain unit; activating at least one operating frequency domain unit; deactivating at least one operating frequency domain unit; and releasing at least one operating frequency domain unit.

17 Claims, 4 Drawing Sheets

(51) Int. Cl.
*H04W 76/20* (2018.01)
*H04W 76/30* (2018.01)
*H04W 80/02* (2009.01)

(58) Field of Classification Search
USPC .......................................... 455/101; 370/329
See application file for complete search history.

(56) References Cited

U.S. PATENT DOCUMENTS

| | | | |
|---|---|---|---|
| 2021/0242977 A1* | 8/2021 | Khoshnevisan | H04L 1/1819 |
| 2022/0078817 A1* | 3/2022 | Zhang | H04B 7/024 |
| 2024/0172245 A1* | 5/2024 | Svedman | H04W 72/1268 |
| 2024/0298235 A1* | 9/2024 | Su | H04W 36/24 |
| 2025/0056205 A1* | 2/2025 | Xiao | H04W 8/183 |

FOREIGN PATENT DOCUMENTS

| | | |
|---|---|---|
| CN | 111615206 | 9/2020 |
| CN | 113518369 | 10/2021 |
| CN | 113766489 | 12/2021 |
| CN | 115226216 | 10/2022 |
| WO | WO 2021197019 | 10/2021 |
| WO | WO 2022193320 | 9/2022 |

OTHER PUBLICATIONS

Office Action in Chinese Appln. No. 202310151374.2, mailed on Apr. 8, 2023, 16 pages (with English translation).
Office Action in Chinese Appln. No. 202310151374.2, mailed on Mar. 22, 2023, 14 pages (with English translation).
Office Action in Chinese Appln. No. 202310151374.2, mailed on Apr. 26, 2023, 6 pages (with English translation).

* cited by examiner

METHOD AND APPARATUS FOR WIRELESS COMMUNICATION

CROSS REFERENCE TO RELATED DISCLOSURES

This application is a continuation of International Application No. PCT/CN2023/081857, filed on Mar. 16, 2023, which claims priority to Chinese Patent Application No. 202310151374.2, filed on Feb. 22, 2023. The disclosures of the aforementioned applications are hereby incorporated by reference in their entireties.

TECHNICAL FIELD

The present disclosure relates to the technical field of communication technology, and more specifically to a method and apparatus for wireless communication.

BACKGROUND

Due to diversified requirements of users, a radio frequency circuit of a terminal device may need to perform related operations in different networks. For example, in a multi-card technology that copes with the needs of some users to separate work and life, the radio frequency circuit of the terminal device may need to switch in different networks.

When the terminal device switches from a current network to other networks, the radio frequency circuit requests a gap (GAP) from a network device corresponding to the current network. The terminal device performs related operations in other networks during the period of this GAP. However, the scheduling of the terminal device from the current network may not be completely avoided in the GAP configured by the network device, thereby preventing the terminal device from realizing the related operations in the other networks.

SUMMARY

Embodiments of the present disclosure provide a method and apparatus for wireless communication. The following describes various aspects related to the embodiments of the present disclosure.

According to a first aspect, a method for wireless communication is provided. The method includes: sending, by a terminal device, a first request, where the first request is used to request a network device to reconfigure an operating frequency domain unit corresponding to the terminal device; where the first request includes first information, and the first information includes at least one of the following configurations: adding at least one operating frequency domain unit; activating at least one operating frequency domain unit; deactivating at least one operating frequency domain unit; and releasing at least one operating frequency domain unit.

According to a second aspect, an apparatus for wireless communication is provided. The apparatus includes a terminal device including: a sending unit, configured to send a first request, where the first request is used to request a network device to reconfigure an operating frequency domain unit corresponding to the terminal device; where the first request includes first information, and the first information includes at least one of the following configurations: adding at least one operating frequency domain unit; activating at least one operating frequency domain unit; deactivating at least one operating frequency domain unit; and releasing at least one operating frequency domain unit.

According to a third aspect, a communication device is provided, including a memory and a processor, where the memory is configured to store a program, and the processor is configured to invoke the program in the memory to perform the method as described in the first aspect.

According to a fourth aspect, a device is provided, including a processor, configured to invoke a program from a memory to perform the method as described in the first aspect.

According to a fifth aspect, a chip is provided, including a processor, configured to invoke a program from a memory to enable a device on which the chip is installed to perform the method as described in the first aspect.

According to a sixth aspect, a computer-readable storage medium is provided, storing a program, where the program enables a computer to perform the method as described in the first aspect.

According to a seventh aspect, a computer program product is provided, including a program that enables a computer to perform the method as described in the first aspect.

According to an eighth aspect, a computer program is provided, where the computer program enables a computer to perform the method as described in the first aspect or the second aspect.

In the embodiments of the present disclosure, the terminal device requests the network device to reconfigure the corresponding operating frequency domain unit. Based on the reconfiguration of the network device, the terminal device adjusts the operating frequency domain unit corresponding to the radio frequency circuit to vacate at least one radio frequency circuit for other networks or other operations. When an idle radio frequency circuit is used in other networks, there is no need to request the GAP. It is seen that, by requesting reconfiguration of the operating frequency domain unit, a communication effect of diversified requirements of the user and a utilization rate of the radio frequency circuit is improved.

DETAILED DESCRIPTION OF THE EMBODIMENTS

Figure 1:
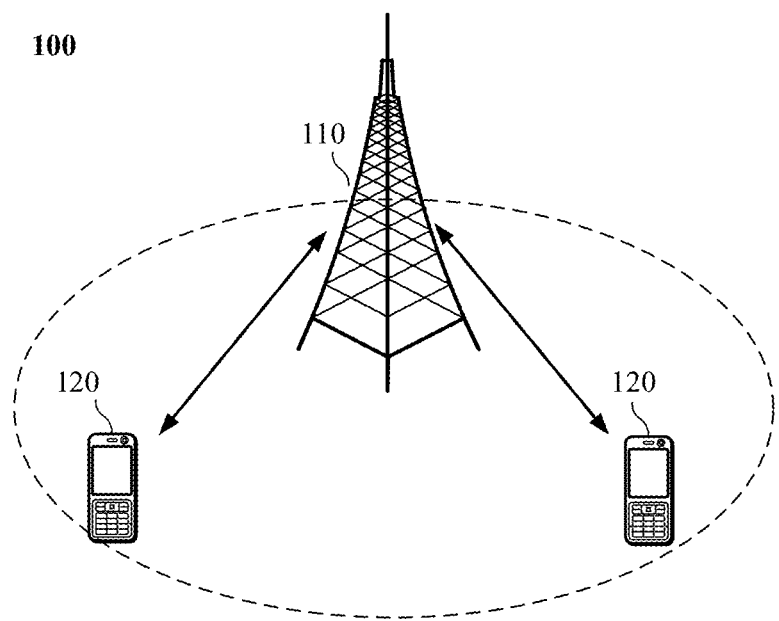
FIG. 1 shows a wireless communication system according to an embodiment of the present disclosure.

The technical solutions in the embodiments of the present disclosure will be described below with reference to the accompanying drawings in the embodiments of the present disclosure. It is apparent that the described embodiments are some of and not all of the embodiments of the present disclosure. All other embodiments obtained by a person of ordinary skill in the art with regard to the embodiments of the present disclosure without creative efforts shall fall within the protection scope of the present disclosure.

Embodiments of the present disclosure may be applied to various communication systems. For example, the embodiments of the present disclosure are able to be applied to a global system of mobile communication (GSM) system, a code division a plurality of access (CDMA) system, a wideband code division a plurality of access (WCDMA) system, a general packet radio service (GPRS) system, a long term evolution (LTE) system, an advanced long term evolution (LTE-A) system, a new radio (NR) system, an evolution system of the NR system, a LTE-based access to unlicensed spectrum (LTE-U) system, an NR-based access to unlicensed spectrum (NR-U) system, a non-terrestrial network (NTN) system, a universal mobile telecommunication system (UMTS), a wireless local area networks (WLAN), wireless fidelity (WiFi), and a fifth generation communication (5G) system. The embodiments of the present disclosure may also be applied to other communication systems, such as future communication systems. The future communication systems may be, for example, a sixth generation (6G) mobile communication system, or a satellite communication system.

The number of connections supported by a conventional communication system is limited, and it is also easy to implement. However, with the development of communication technology, the communication system may not only support conventional cellular communication, but may also support one or more types of communications. For example, the communication system may support one or more kinds of the following communication: device to device (D2D) communication, machine to machine (M2M) communication, machine type communication (MTC), vehicle to vehicle (V2V) communication, and vehicle to everything (V2X) communication, etc. Embodiments of the present disclosure are also able to be applied to a communication system that supports the above communication modes.

The communication system in the embodiments of the present disclosure may be applied to a carrier aggregation (CA) scenario, a dual connectivity (DC) scenario, or a standalone (SA) networking scenario.

The communication system in the embodiments of the present disclosure may be applied to an unlicensed spectrum. The unlicensed spectrum may also be considered to be a shared spectrum. Alternatively, the communication system in the embodiments of the present disclosure may also be applied to a licensed spectrum. The licensed spectrum may also be considered to be a dedicated spectrum.

The embodiments of the present disclosure may be applied to a terrestrial network (TN) system, or may be applied to the NTN system. As an example, the NTN system includes a 4G-based NTN system, an NR-based NTN system, an internet of things (IoT)-based NTN system, and a narrowband internet of things (NB-IoT)-based NTN system.

The communication system includes one or more terminal devices. The terminal device mentioned in the embodiments of the present disclosure may be referred to as a user equipment (UE), an access terminal, a user unit, a user station, a mobile station (MS), a mobile terminal (MT), a remote station, a remote terminal, a mobile device, a user terminal, a terminal, a wireless communication device, a user agent, or a user device, etc.

In some embodiments, the terminal device may be a station (ST) in a WLAN. In some embodiments, the terminal device may be a cellular phone, a cordless telephone, a session initiation protocol (SIP) phone, a wireless local loop (WLL) station, a personal digital assistant (PDA) device, a handheld device having a wireless communication function, a computing device or other processing devices connected to a wireless modem, a vehicle-mounted device, a wearable device, a terminal device in a next generation communication system (such as the NR system), or a terminal device in a future evolved public land mobile network (PLMN) network, etc.

In some embodiments, the terminal device may be a device that provides voice and/or data connectivity to the user. For example, the terminal device may be a handheld device having a wireless connection function, a vehicle-mounted device, etc. As some specific examples, the terminal device may be a mobile phone, a Pad, a notebook, a handheld computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in smart home, etc.

In some embodiments, the terminal device may be deployed on land. For example, the terminal device may be deployed indoors or outdoors. In some embodiments, the terminal device may be deployed on water, such as on a wheel vessel. In some embodiments, the terminal device may be deployed in air, such as on an aircraft, balloon, and satellite.

In addition to the terminal device, the communication system may further include one or more network devices. The network device in the embodiments of the present disclosure may be a device for communicating with the terminal device, and the network device may also be referred to as an access network device or a wireless access network device. The network device may be, for example, a base station. The network device in the embodiments of the present disclosure may refer to a radio access network (RAN) node (or device) that accesses the terminal device to a wireless network. The base station may broadly cover various names in the following, or be replaced with the following names. For example, a node B (NodeB), an evolved NodeB (eNB), a next generation NodeB (gNB), a relay station, an access point, a transmitting node, a transceiver node, a base band unit (BBU), a remote radio unit (RRU), an active antenna unit (AAU), a remote radio unit (RRH), a central unit (CU), a distributed unit (DU), a positioning node, and the like. The base station may be a macro base station, a micro base station, a relay node, a donor node or the like, or a combination thereof. The base station may also refer to a communication module, a modem, or a chip for being disposed in the foregoing device or apparatus. The base station may also be a mobile switching center and a device that plays a role of the base station in the D2D, V2X, and M2M communication, a network side device in a 6G network, and a device that plays a role of the base station in a future communication system, etc. The base station supports networks of the same or different access technologies. The specific technology adopted by the network device and a specific form of the device in the embodiments of the present disclosure are not limited in the embodiments of the present disclosure.

The base station may be fixed or mobile. For example, a helicopter or drone may be configured to function as a mobile base station, and one or more cells move according to the location of the mobile base station. In other examples, the helicopter or drone may be configured to function as a device in communication with another base station.

In some deployments, the network device in the embodiments of the present disclosure may refer to the CU or the DU, or the network device includes the CU and the DU. The gNB may include the AAU.

As an example, and not limitation, in the embodiments of the present disclosure, the network device has a mobility characteristic, for example, the network device may be a mobile device. In some embodiments of the present disclosure, the network device may be a satellite or a balloon station. In some embodiments of the present disclosure, the network device may be a base station disposed on land, water, and other locations.

In the embodiments of the present disclosure, the network device may provide a service for a cell, and the terminal device communicates with the network device through a transmission resource (for example, a frequency domain resource, or a spectrum resource) used by the cell. The cell may be a cell corresponding to a network device (for example, a base station), and the cell may belong to a macro base station, or may belong to a base station corresponding to a small cell. The small cell includes a metro cell, a micro cell, a pico cell, a femto cell, etc. These small cells have characteristics of small coverage and low transmission power, and are suitable for providing a high-rate data transmission service.

For example, FIG. 1 shows a schematic architectural diagram of a communication system according to an embodiment of the present disclosure. As shown in FIG. 1, the communication system 100 includes a network device 110, and the network device 110 is a device in communication with a terminal device 120 (or referred to as a communication terminal or a terminal). The network device 110 provides communication coverage for a particular geographic region and is able to communicate with terminal devices located within the coverage region.

FIG. 1 exemplarily shows a network device and two terminal devices. In some embodiments of the present disclosure, the communication system 100 may include a plurality of network devices, and a coverage range of each network device may include other numbers of terminal devices, which is not limited in the embodiments of the present disclosure.

In the embodiments of the present disclosure, the wireless communication system shown in FIG. 1 further includes other network entities such as a mobility management entity (MME), an access and mobility management function (AMF), or the like, which is not limited in the embodiments of the present disclosure.

It should be understood that a device having a communication function in a network/system in the embodiments of the present disclosure may be referred to as a communication device. Taking the communication system 100 shown in FIG. 1 as an example, the communication device includes the network device 110 and the terminal device 120 that have communication functions, and the network device 110 and the terminal device 120 may be specific devices described above, and details are not described herein again. The communication device may further include other devices in the communication system 100, such as a network controller, a mobility management entity, or other network entities, which is not limited in the embodiments of the present disclosure.

For ease of understanding, some related technical knowledge involved in the embodiments of the present disclosure will be described in conjunction with the accompanying drawings. The following related technologies, as optional solutions, may be arbitrarily combined with the technical solutions of the embodiments of the present disclosure, which fall within the protection scope of the embodiments of the present disclosure. The embodiments of the present disclosure include at least some of the following contents.

Figure 2:
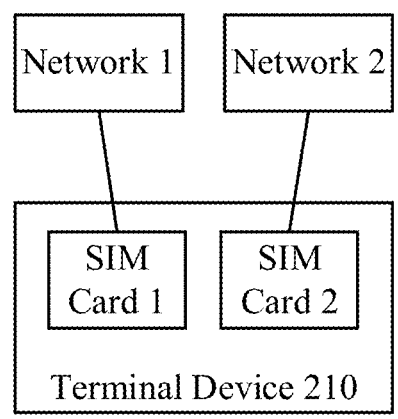
FIG. 2 shows a schematic structural diagram of a multi-card technology applied in an embodiment of the present disclosure.

The development of communication technology and the diversified requirements of users for communication supplement each other. For example, in order to cope with communication requirements of some users for separating work and life, a third-generation partnership project (3GPP) introduces a multi-card technology. Taking a dual-card technology as an example, two subscriber identity module (SIM) cards may be connected to the interior of the same terminal device. As shown in FIG. 2, two cards are connected to the interior of the terminal device 210, which are respectively a SIM card 1 and a SIM card 2, and the SIM card 1 corresponds to a network 1, and the SIM card 2 corresponds to a network 2.

In some embodiments, two cards connected to the interior of the terminal device correspond to a network of a same PLMN or operator. For example, the two cards correspond to a network of China mobile. When the two cards correspond to the same PLMN or the same operator, corresponding two network elements on the network side are able to interact with each other. Taking FIG. 2 as an example, when the network 1 and the network 2 correspond to the same PLMN, the network 1 and the network 2 are able to interact with each other.

In some embodiments, two cards connected to the interior of the terminal device correspond to networks of different PLMNs or different operators. For example, the two cards correspond to networks of China Mobile and China Communication, respectively. When the two cards correspond to the networks of different PLMNs or different operators, there is no interaction between the network elements on the network side that correspond to the two cards. Still taking FIG. 2 as an example, the network 1 and the network 2 correspond to different PLMNs, and the network 1 and the network 2 do not interact with each other.

If communication modes of the terminal device in the foregoing two scenarios are considered, a related protocol needs to specify interaction processes in different scenarios. In order to make the protocol simple, the current protocol designs a unified process to support the above two application scenarios. For example, in a 3GPP protocol, it is assumed that there is no interaction between two or more networks connected by the terminal device. Therefore, it is generally considered that there is no interaction between two networks corresponding to the two cards connected to the interior of the terminal device.

In the case that the two networks do not interact with each other, the terminal device may need to switch between different networks to perform certain operations. For example, the terminal device needs to periodically perform some operations in the network 2 when the terminal device is in a connected state in the network 1 and is in an idle state in the network 2. These operations are, for example, receiving paging, performing an idle state or an inactive state measurement, measuring a signal of a resident cell/other frequency points to determine whether to perform cell reselection or the like. The terminal device is able to perform these operations in the network 2 by notifying the network 1 of "I need to ask for leave".

The terminal device may implement connection with different networks based on an internal radio frequency circuit. In some embodiments, the terminal device may be connected to two networks based on the same radio frequency circuit. When switching between two networks, the terminal device needs to inform the network device that is currently connected. For example, when the terminal device is connected to the network 1 and the network 2 based on one radio frequency circuit and switches from the network 1 to the network 2 to perform some operations, the terminal device needs to ask the network 1 for leave.

For ease of understanding, taking the terminal device in a radio resource control (RRC) connection state in the network 1 and in an idle state or an inactive state in the network 2 as an example. Based on different states of the terminal device in the network 1 and the network 2, the terminal device needs to periodically perform some operations in the network 2. Since the network 1 and the network 2 do not interact with each other, the network 1 may not know the time point and duration of the terminal device performing the operations in the network 2. For example, only the terminal device and the network 2 can determine a paging occasion in the network 2. Therefore, the terminal device needs to inform the network 1 of specific leave information when asking the network 1 for leave. For example, the terminal device may notify the network 1 of "how often does it ask for leave, a start moment of the leave is XXX, and an end moment of the leave is XXXX", and this information is collectively referred to as terminal device assistance information.

For network 1, the network 1 configures a GAP for the terminal device according to the assistance information provided by the terminal device. During the GAP, the terminal device may switch to the network 2 to perform operations such as receiving paging and measurement, etc. The network device corresponding to the network 1 does not schedule the terminal device during the GAP.

However, with the development of communication technology, the network device may not completely avoid scheduling the terminal device during the GAP. For example, two frequency ranges (FR) are defined in the NR system, which are FR1 and FR2, respectively, FR1 and FR2 are generally not implemented using the same radio frequency circuit. In an NR protocol, the network device configures three GAPs, i.e., GAP of FR1, GAP of FR2, and GAP of the terminal device. During the GAP of FR1, the network device corresponding to the network 1 does not schedule the terminal device on a carrier corresponding to the FR1, but may schedule the terminal device on a carrier corresponding to the FR2. Similarly, during the GAP of FR2, the network device corresponding to the network 1 does not schedule the terminal device on the carrier corresponding to the FR2, but may schedule the terminal device on the carrier corresponding to the FR1. During the GAP of the terminal device, the network device corresponding to the network 1 does not schedule the terminal device on the carrier corresponding to the FR1, and does not schedule the terminal device on the carrier corresponding to the FR2. Therefore, in the case of configuring the GAP of FR1 and the GAP of FR2, the network device may not be able to completely avoid scheduling the terminal device during the GAP.

Figure 3:
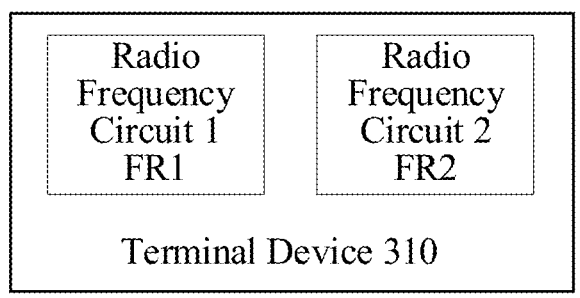
FIG. 3 shows a schematic structural diagram of a terminal device in a new radio (NR) system.

On the other hand, the terminal device may report supported bands and band combinations to the network device based on the plurality of radio frequency circuits. The network device configures CA and/or DC for the terminal device according to the support condition of the band combinations reported by the terminal device. How the terminal device operates on a plurality of carriers using the plurality of radio frequency circuits belongs to an internal implementation of the terminal device. That is, when the terminal device is configured with CA, DC, etc., in the network 1, the network device corresponding to the network 1 does not know how the terminal device operates. Typically, if the terminal device supports a combination of FR1 and FR2, the network device configures DC for the terminal device, and the terminal device may operate on one or more carriers of the FR1 with one radio frequency circuit and operate at one or more carriers of the FR2 with another radio frequency circuit. As shown in FIG. 3, a radio frequency circuit 1 of a terminal device 310 operates at FR1, and a radio frequency circuit 2 of the terminal device 310 operates at the F2. The network device may configure measurement GAPs for carriers of FR1 and FR2 independently, or may configure a GAP common to the FR1 and FR2. When the network device configures GAPs for the carriers of FR1 and FR2 independently, there is the above problem that the network device may schedule the terminal device during the GAP.

Based on the above problem, the actual operation condition is analyzed, and it is found that in some implementation scenarios, the terminal device does not need to request a GAP to the network device of the current network, so that interaction requirements and the above problem caused by requesting the GAP are avoided. In these scenarios, the terminal device may operate in the same FR with a plurality of radio frequency circuits. For example, two radio frequency circuits of the terminal device operate in FR1 of the network 1. When the network device configures a plurality of carriers for the terminal device, the terminal device may operate on a plurality of carriers with two radio frequency circuits respectively, or may operate on a plurality of carriers with one radio frequency circuit, and the other radio frequency circuit is idle. In a scenario where the radio frequency circuit is idle, when the terminal device needs to switch to the network 2, the idle radio frequency circuit directly performs operations in the network 2, such as receiving paging, and performing an idle state or an inactive state measurement, etc. That is, the GAP may not be requested when the terminal device switches to the network 2, thereby avoiding the above problem.

For ease of understanding, with reference to FIG. 4 and FIG. 5, two ways in which two radio frequency circuits operate on a plurality of carriers of the same FR are described in detail below.

Figure 4:
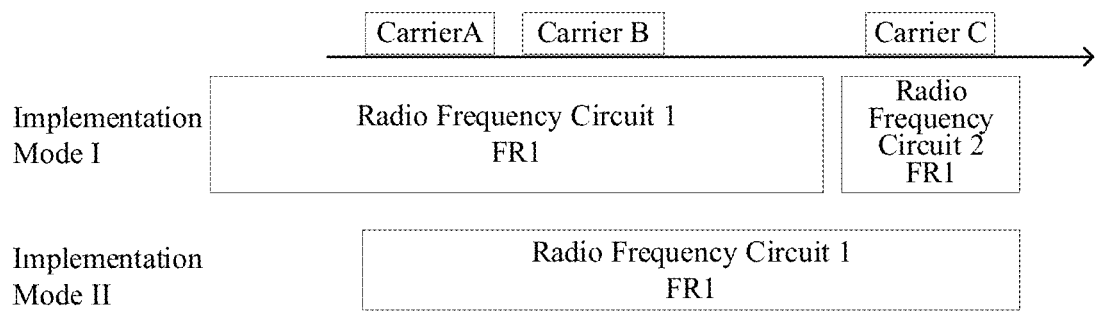
FIG. 4 shows a schematic diagram of a correspondence between two radio frequency circuits and a plurality of carriers.
Figure 5:
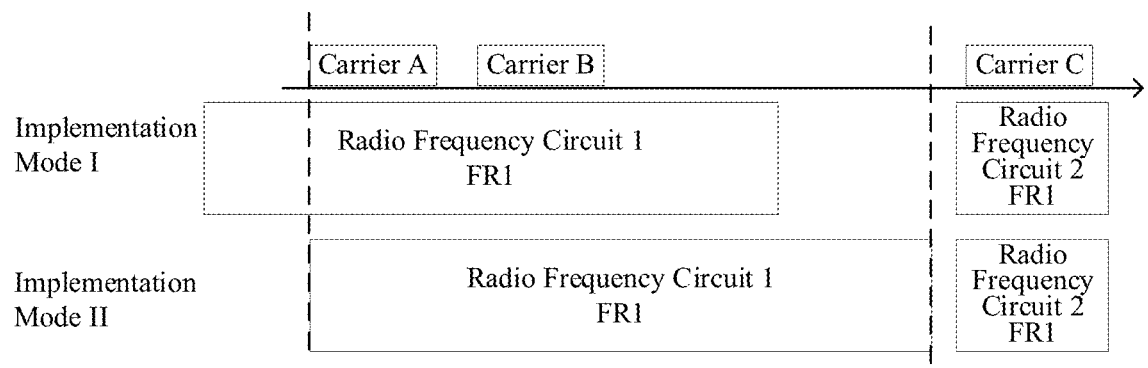
FIG. 5 shows another schematic diagram of a correspondence between two radio frequency circuits and a plurality of carriers.

Referring to FIG. 4 and FIG. 5, the network device corresponding to the network 1 configures three carriers of FR1 for the terminal device, which are a carrier A, a carrier B and a carrier C, respectively. The terminal device has two radio frequency circuits, which are a radio frequency circuit 1 and a radio frequency circuit 2, respectively.

As shown in FIG. 4, two radio frequency circuits of the terminal device may have two implementation modes with respect to corresponding carriers. In implementation mode I, the radio frequency circuit 1 operates on the carrier A and the carrier B, and the radio frequency circuit 2 operates on the carrier C. In implementation mode II, the radio frequency circuit 1 operates on the carrier A, the carrier B and the carrier C, and the radio frequency circuit 2 is in an idle state.

In the two implementation modes shown in FIG. 4, if the terminal device needs to operate in the network 2, implementation modes of the terminal device are different. For the implementation mode I, the terminal device needs to request a GAP to the network device corresponding to the network 1. For the implementation mode 2, the terminal device does not need to request a GAP to the network device corresponding to the network 1. It should be noted that, for the terminal device originally implemented in the implementation mode I, the terminal device may also be automatically changed to the implementation mode II, and a radio frequency circuit is vacated to receive paging, and measuring reference signals, etc., in the network 2. When the terminal device automatically changes to the implementation mode II, the GAP does not need to be requested to the network device corresponding to the network 1.

Compared with FIG. 4, the implementation mode I in FIG. 5 is the same as that in FIG. 4. The terminal device usually operates in the implementation mode I. Differently, the radio frequency circuit 1 in FIG. 5 cannot be automatically changed to the implementation mode II shown in FIG. 4. Since an adjustable operating frequency range of the radio frequency circuit is limited, the radio frequency circuit may not be able to support a plurality of carriers configured by the network device by adjusting the operating frequency range. Specifically, as the implementation mode II shown in FIG. 5, the radio frequency circuit 1 of the terminal device cannot cover the carrier A, the carrier B and the carrier C, that is, the radio frequency circuit 1 cannot operate on three carriers at the same time, and the carrier C needs to be implemented by the radio frequency circuit 2. Therefore, when the terminal device in FIG. 5 needs to switch to the network 2, the GAP needs to be requested to the network device of the network 1.

In summary, in the existing process, the network device corresponding to the network 1 receives the GAP request from the terminal device, and configures the GAP for the terminal device, so as to meet operating requirements of the terminal device in the network 2. In this case, the terminal device may vacate a radio frequency circuit to operate in the network 2 by adjusting the operating frequency range of the radio frequency circuit, so as not to request the GAP from the current network. However, when the terminal device needs to vacate a radio frequency circuit, the remaining radio frequency circuit of the terminal device may not be able to support a plurality of carriers configured by the current network, which reduces available frequency domain resources.

Based on this, embodiments of the present disclosure provide a method for wireless communication. In this method, a terminal device reconfigures a carrier on which the first radio frequency circuit operates by requesting a network device corresponding to a current network, vacates other radio frequency circuits to operate in other networks or perform other operations different from those of the first radio frequency circuit, so that a GAP does not need to be requested to the current network during network switching. The method according to the embodiments of the present disclosure is described in detail below with reference to FIG. 6.

Figure 6:
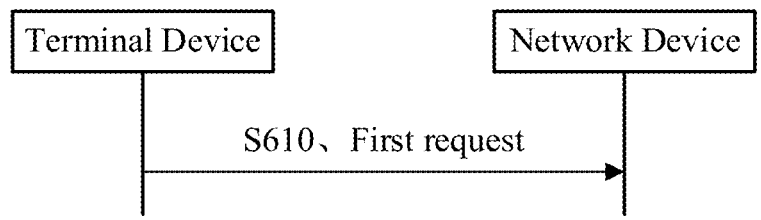
FIG. 6 shows a schematic flowchart of a method for wireless communication according to an embodiment of the present disclosure.

The method shown in FIG. 6 is introduced from a point of view of interaction between a terminal device and a network device.

The terminal device may be any of the above terminal devices communicating with the network device. In some embodiments, the terminal device may be a communication device supporting dual-card or multi-card technology. For example, the terminal device may be the terminal device 210 supporting the dual-card technology shown in FIG. 2. In some embodiments, the terminal device performs related operations in different networks or different frequency ranges through a plurality of internal radio frequency circuits. For example, the terminal device may be the terminal device 310 shown in FIG. 3.

The network device may be any network device connected to the terminal device. In some embodiments, the network device may be a communication device that establishes an RRC connection with the terminal device. That is, the network device may be a communication device that currently provides a network service for the terminal device. Taking the terminal device 210 in FIG. 2 as an example, the network device may correspond to the network 1 or the network 2 in FIG. 2.

Referring to FIG. 6, in S610, a terminal device sends a first request.

The first request is used for the terminal device requesting the network device to reconfigure an operating frequency domain unit corresponding to the terminal device. That is to say, the terminal device suggests to the network device through the first request to adjust the corresponding operating frequency domain unit. In some embodiments, the network device performs the reconfiguration directly according to the suggestion of the terminal device. For example, the network device reconfigures the operating frequency domain unit corresponding to the terminal device according to the first request. In some embodiments, the network device considers the operating frequency range of the terminal device during subsequent configurations based on the suggestion of the terminal device. For example, the network device is able to directly modify the operating frequency domain unit corresponding to the terminal device based on the first request. However, the first request of the terminal device represents an operating range of the radio frequency circuit of the terminal device. This factor may be considered when the network device performs a subsequent configuration. In some embodiments, the network device does not reconfigure the operating frequency domain unit of the terminal device due to an allocation condition of a frequency domain resource or other reasons.

The operating frequency domain unit corresponding to the terminal device may refer to a cell, or may refer to the frequency domain resource. In some embodiments, the operating frequency domain unit may be a cell corresponding to the terminal device. The cell may be a primary cell or a secondary cell. In some embodiments, the operating frequency domain unit may be different frequency domain ranges in which the radio frequency circuit of the terminal device operates. For example, the operating frequency domain unit may be a sub-band in a carrier, a carrier, a carrier combination, or a band.

The operating frequency domain unit corresponding to the terminal device may also be referred to as a dedicated frequency domain unit of the terminal device. For example, when the operating frequency domain unit is the carrier, a carrier corresponding to the terminal device is the carrier dedicated to the terminal device.

Reconfiguring the operating frequency domain unit corresponding to the terminal device refers to re-adjusting the operating frequency domain unit corresponding to the terminal device. The readjustment may be one or more configurations of adding the operating frequency domain unit, activating the operating frequency domain unit, releasing the operating frequency domain unit, and deactivating the operating frequency domain unit. For example, one operating frequency domain unit is added, and reconfiguring the operating frequency domain unit corresponding to the terminal device may be adding one cell, one carrier, or one carrier combination to the terminal device.

The terminal device may correspond to a plurality of operating frequency domain units, and the first request may indicate an operating frequency domain unit requested to be reconfigured by the network device. Based on the first request, the terminal device suggests a reconfigured operating frequency domain unit to the network device. Taking FIG. 5 as an example, the terminal device corresponds to three carriers (carriers A, B, and C), and the first request may suggest that the network device adjusts the operating frequency domain unit corresponding to the terminal device based on the carrier C, e.g., releasing the carrier C corresponding to the terminal device or the deactivating the carrier C. Still taking FIG. 5 as an example, the first request may further suggest the network device to adjust the operating frequency domain unit corresponding to the terminal device based on a carrier D, e.g., adding the carrier D to the terminal device or activating the carrier D.

The operating frequency domain unit suggested to be reconfigured in the first request may be related to the radio frequency circuit of the terminal device. The operating frequency domain unit is adjusted based on one or more radio frequency circuits in the plurality of radio frequency circuits of the terminal device, which helps to enable at least one of the plurality of radio frequency circuits to be in the idle state. The radio frequency circuit associated with the reconfiguration of the operating frequency domain unit may be referred to as a first radio frequency circuit.

In some embodiments, the operating frequency domain unit requested to be reconfigured may be related to an operating frequency range corresponding to the first radio frequency circuit. For example, the terminal device adjusts an operating frequency domain unit corresponding to the terminal device according to the operating frequency range of the first radio frequency circuit. Through this adjustment, other at least one radio frequency circuit may be vacated in the case of satisfying the frequency domain resource. That is, the terminal device enables at least one radio frequency circuit other than the first radio frequency circuit to be in the idle state by adjusting the operating frequency domain unit.

For example, the terminal device is able to determine, based on the operating frequency range of the radio frequency circuit, a band in which the operating frequency domain unit requested to be reconfigured is. In order to vacate at least one radio frequency circuit, the plurality of operating frequency domain units that the terminal device requests to reconfigure may belong to the same band, or may belong to different bands.

As a possible implementation, operating frequencies of two radio frequency circuits of the terminal device may respectively support frequency domain units of FR1 and FR2. In this scenario, in order to vacate a radio frequency circuit, the frequency domain units requested to be added and released may not belong to the same band. For example, the first radio frequency circuit of the terminal device operates on two carriers of the FR1, and the second radio frequency circuit operates on one carrier of the FR2. That is, a range of the band supported by the first radio frequency circuit is the FR1 or a partial band in FR1, and a range of the band supported by the second radio frequency circuit is the FR2 or a partial band in FR2. The terminal device may request to release the carrier corresponding to the FR2, and request to add the carrier corresponding to the FR1, so that the second radio frequency circuit is in the idle state. The added carrier should be a carrier that can be covered by the first radio frequency circuit.

As another possible implementation, operating frequencies of the plurality of radio frequency circuits of the terminal device may all support the frequency domain units of the FR1, or all support the frequency domain units of the FR2. In this scenario, in order to vacate a radio frequency circuit, the frequency domain units requested to be added and released may belong to the same band. For example, both the first radio frequency circuit and the second radio frequency circuit of the terminal device operate on a plurality of carriers of the FR1. The terminal device may request to release one or more carriers on which the second radio frequency circuit operates, and request to add one or more carriers that can be covered by the first radio frequency circuit, so that the second radio frequency circuit is in the idle state.

Operating frequency ranges corresponding to the first radio frequency circuit refers to one or more operating frequency ranges that can be adjusted by the first radio frequency circuit. In some embodiments, the first radio frequency circuit may support a plurality of frequency ranges by controlling. For example, the first radio frequency circuit is the radio frequency circuit 1 shown in FIG. 4, and the frequency domain range supported by the radio frequency circuit 1 is adjusted to switch from the implementation mode I to the implementation mode II. That is, the operating frequency range of the first radio frequency circuit may be adjusted according to the operating frequency domain unit.

The first radio frequency circuit may be one or more radio frequency circuits to be reconfigured in the terminal device. The first radio frequency circuit may be one of a plurality of radio frequency circuits of the terminal device, and the first radio frequency circuit may be determined based on operating frequency ranges corresponding to the plurality of radio frequency circuits. As an example, the terminal device may determine which radio frequency circuit is the first radio frequency circuit that needs to be reconfigured according to the operating frequency ranges corresponding to the plurality of radio frequency circuits. For example, the terminal device may evaluate, according to the operating ranges of two radio frequency circuits, that the operating frequency domain unit corresponding to which radio frequency circuit needs to be reconfigured to enable the other radio frequency circuit to be in the idle state.

As a possible implementation, the first radio frequency circuit changes the frequency domain resource of the operating of the terminal device by reconfiguring. The change of the frequency domain resource may be determined by the number and/or frequency range of the operating frequency domain units adjusted by the first radio frequency circuit. For example, carriers on which the first radio frequency circuit operates may be changed from three carriers to two carriers according to the first request of the terminal device. As another example, the carriers on which the first radio frequency circuit operates are still three carriers, but a frequency range of at least one of the three carriers is different from that of the original carrier.

The terminal device requests for replacing the operating frequency domain unit to the network device through the first request. The terminal device may suggest how to perform reconfiguration of the operating frequency domain unit to the network device in a plurality of manners in the first request. In some embodiments, the first request includes first information, and the terminal device proposes a configuration suggestion through the first information. For example, the first request may be terminal device assistance information mentioned above, and the first information may be information added in the assistance information.

It should be noted that the first request sent by the terminal device is only a proposition to the network device, and is not a final decision. The final decision is made by the network device. Specifically, the network device may finally decide whether to reconfigure the operating frequency domain unit corresponding to the terminal device based on the first request. The network device may also determine, based on the first information in the first request, how to reconfigure the operating frequency domain unit corresponding to the terminal device. Therefore, the following description regarding the first information is the suggestion proposed by the terminal device to the network device.

The first information may include one or more configurations of the operating frequency domain units. These configurations may be adding the operating frequency domain unit, activating the operating frequency domain unit, deactivating the operating frequency domain unit, and releasing the operating frequency domain unit. The number of added, released, or activated operating frequency domain units may be one or more, which is not limited herein.

In some embodiments, the first information may include adding at least one operating frequency domain unit. Adding the operating frequency domain unit improves the operating frequency domain resource of the terminal device. Adding at least one operating frequency domain unit refers to that the terminal device requests the network device to further configure one or more operating frequency domain units for the first radio frequency circuit. For example, when the operating frequency domain units are the carriers shown in FIG. 5, the terminal device may select a carrier other than the carrier A and the carrier B within the operating frequency range of the radio frequency circuit 1, and then send the first information to the network device.

Exemplarily, the terminal device may determine the operating frequency domain unit requested to be added in a plurality of manners. As a possible implementation, the terminal device requests the network device to perform reconfiguration of the operating frequency domain unit based on the carrier. For example, the entire added carrier requested by the terminal device from the network device is within the operating frequency of the first radio frequency circuit. As another possible implementation, the terminal device determines the operating frequency domain unit requested to be added based on the sub-band in the carrier. Still taking FIG. 5 as an example, the terminal device selects a carrier other than the carrier A and the carrier B within the operating frequency range of the radio frequency circuit 1, which means that a sub-band corresponding to an initial bandwidth part (BWP), not the entire band, of the newly selected carrier is within the operating frequency of the radio frequency circuit 1 of the terminal device.

Exemplarily, the operating frequency domain unit requested to be added may be an alternative frequency domain unit of the network where the network device is located. For example, the network corresponding to the network device may further have a plurality of alternative carriers. When the first information is adding at least one carrier, the terminal device may select one or more carriers from the alternative carriers according to the operating frequency range of the first radio frequency circuit. In some embodiments, the operating frequency domain unit requested to be added may be a non-alternative frequency domain unit of the network where the network device is located.

Exemplarily, the operating frequency domain unit requested to be added may be a frequency domain unit found by the terminal device by measuring. Still taking the carriers shown in FIG. 5 as an example, in the operating frequency range of the radio frequency circuit 1, when the terminal device finds that the carrier D has a good signal quality by measuring, the terminal device may request to add the carrier D in the first information. In some embodiments, the terminal device may not measure the operating frequency domain unit requested to be added, so as to reduce power consumption.

The terminal device may determine, by means of a plurality of measurement modes, the operating frequency domain unit that is desired to add. For example, the terminal device may determine a desired added carrier through radio resource management (RRM) measurement results.

For example, the terminal device may request to add a plurality of operating frequency domain units through the first information. In some embodiments, the plurality of operating frequency domain units may be in the same band. For example, a plurality of carriers desired to be added in the first information are in the same band. In some embodiments, the plurality of operating frequency domain units may be in different bands. For example, the plurality of carriers desired to be added in the first information are in a plurality of bands in FR1, respectively.

For example, when the terminal device suggests to add the operating frequency domain unit through the first request, the first request may suggest whether to activate the operating frequency domain unit to the network device. For example, the first request requests to add and activate at least one operating frequency domain unit. For another example, the first request only requests to add at least one operating frequency domain unit, and does not indicate whether to activate the at least one operating frequency domain unit.

In some embodiments, the first information may include activating at least one operating frequency domain unit. The operating frequency of the radio frequency circuit of the terminal device may be adjusted to activate the operating frequency domain unit. Activating the at least one operating frequency domain unit may refer to that the terminal device requests the network device to activate one or more operating frequency domain units that have been configured for the terminal device. For example, in the plurality of carriers configured by the network device for the terminal device, only some carriers are activated, and the terminal device may request to activate one or more inactivated carriers through the first information.

For example, the operating frequency domain unit requested to be activated may also be a frequency domain unit that is confirmed by the terminal device by means of measurement. The measurement mode is the same as that of the operating frequency domain unit requested to be added, which is not described herein again.

For example, the terminal device requests to activate the plurality of operating frequency domain units through the first information. In some embodiments, the plurality of operating frequency domain units are in the same band. For example, a plurality of carriers desired to be activated in the first information are in the same band. In some embodiments, the plurality of operating frequency domain units are in different bands. For example, a plurality of carriers desired to be activated in the first information are in a plurality of bands in FR1, respectively.

In some embodiments, the first information may include adding at least one operating frequency domain unit and activating at least one operating frequency domain unit. As an example, the operating frequency domain units requested to be activated may be the operating frequency domain units requested to be added, or may be some of the plurality of operating frequency domain units requested to be added. For example, the terminal device may indicate to the network device through the first request that a carrier combination is desired to be added, and some of carriers in the carrier combination are desired to be activated.

As an example, the terminal device requesting to adding at least one operating frequency domain unit refers to adding a plurality of operating frequency domain units. In this case, the first information is further configured to request the network device to determine whether to activate some or all of the plurality of operating frequency domain units. For example, the first information may suggest the network device to activate some of carriers in the carrier combination.

As a possible implementation, when the first information includes adding and activating the at least one operating frequency domain unit, the operating frequency domain unit requested to be activated in the first information should be within the range of the added operating frequency domain units. Taking the request to activate a cell as an example, the cell requested to be activated in the first information must be in the range of the added cells. The terminal device cannot request to activate other cells not in a list of the added cells.

For example, the terminal device may suggest to the network device, by means of a variable, whether to activate some of the plurality of added operating frequency domain units, and may also indicate which operating frequency domain units that are desired to be activated in detail. For example, the terminal device may suggest 'whether it is desired to activate some of the carriers in the carrier combination' by means of a Boolean variable. A value of the Boolean variable being true indicates that some of carriers in the carrier combination are desired to be activated, and the value of the Boolean variable being false indicates that some of carriers in the carrier combination are not desired to be activated. Conversely, the value of the Boolean variable being true indicates that some of carriers in the carrier combination are not desired to be activated, and the value of the Boolean variable being false indicates that some of carriers in the carrier combination are desired to be activated. As another example, the terminal device may suggest which carriers in the carrier combination desired to be activated by enumerating variables in detail.

In some embodiments, the first information may include deactivating at least one operating frequency domain unit. Deactivating the at least one operating frequency domain unit may refer to that the terminal device requests the network device to configure the one or more operating frequency domain units to be in an inactive state. That is, the operating frequency domain unit is still in a configuration list of the terminal device, but the radio frequency circuit of the terminal device does not always measure the operating frequency domain unit. For example, the terminal device operates on three carriers configured by the network device, one or two carriers may be deactivated according to the first information, and the terminal device only operates on the remaining carriers.

In some embodiments, the first information may further include activating the at least one operating frequency domain unit and deactivating the at least one operating frequency domain unit, which are not described herein again.

In some embodiments, the first information may include releasing at least one operating frequency domain unit. Releasing the at least one operating frequency domain unit may refer to that the terminal device requests the network device to release one or more operating frequency domain units in the configuration list. For example, when the operating frequency domain units are the carriers shown in FIG. 5, the terminal device requests the network device to release the carrier C, so that the radio frequency circuit 1 of the terminal device covers the carrier A and the carrier B, and the radio frequency circuit 2 enters the idle state.

As an example, the terminal device may request to release the plurality of operating frequency domain units through the first information. In some embodiments, the plurality of operating frequency domain units are in the same band. For example, a plurality of carriers desired to be released in the first information are in the same band. In some embodiments, the plurality of operating frequency domain units are in different bands. For example, a plurality of carriers desired to be released in the first information are in a plurality of bands in the FR1, respectively.

In some embodiments, the first information includes releasing at least one operating frequency domain unit and deactivating at least one operating frequency domain unit. For example, when the terminal device suggests to release the operating frequency domain unit through the first request, the first request may indicate that the operating frequency domain unit is desired to be released or is desired to be deactivated. For example, the first request may suggest the network device to release at least one carrier. For another example, in a plurality of carriers requested to be reconfigured, the first request may suggest the network device to releases only some of the carriers, and deactivate rather than release the other carriers.

When the terminal device includes a plurality of radio frequency circuits, at least one radio frequency circuit may be vacated by releasing and/or deactivating at least one operating frequency domain unit. The radio frequency circuit is another radio frequency circuit in the terminal device in addition to the first radio frequency circuit. That is, through the configuration of the first request, the terminal device may have one or more radio frequency circuits in the idle state. The radio frequency circuit in the idle state may be configured to perform a variety of operations. For example, in a terminal device supporting a multi-card technology, the radio frequency circuit in the idle state may connect to a service network different from the current network, and perform operations such as receiving paging. For example, the radio frequency circuit 2 in FIG. 5, after being in the idle state, is able to be connected to a network provided by an operator different from an operator of the radio frequency circuit 1. Exemplarily, the radio frequency circuit in the idle state may further perform some other operations under the requirement of the current network. For example, the radio frequency circuit 2 in the idle state may perform some forwarding operations as a repeater of the current network system.

In some embodiments, the first information includes adding at least one operating frequency domain unit and releasing at least one operating frequency domain unit. That is to say, in order to ensure current operations of the terminal device, the terminal device may request to add the operating frequency domain unit while requesting to release the operating frequency domain unit, thereby ensuring the frequency domain resource of the operating of the radio frequency circuit. Replacement of the operating frequency domain unit corresponding to the first radio frequency circuit is implemented by adding and releasing the operating frequency domain unit.

For example, when the terminal device requests to add and release the operating frequency domain unit to the network device at the same time, the operating frequency domain unit requested to be added in the first information corresponds to the same band as the operating frequency domain unit requested to be released in the first information. If the operating frequency domain units that are desired to be replaced are not in the same band, the operating frequency range of the first radio frequency circuit may not support the newly added operating frequency domain unit. For example, when the carrier A requested to be released by the terminal device is in FR1 and the carrier B requested to be released is in FR2, the radio frequency circuit supporting the carrier A cannot operate on the carrier B.

For example, when the terminal device requests to add and release the operating frequency domain unit to the network device at the same time, the first request determines, according to the operating frequency range corresponding to the first radio frequency circuit, the operating frequency domain units to be added and released. Taking the carrier as an example, when the terminal device requests that "it is desired to release a carrier and it is desired to add a carrier" to the network device at the same time, the released and added carriers are not any combination but a limited combination of the carriers corresponding to the previous deletion configuration and addition configuration. The configurations are described in detail with reference to FIG. 7 and FIG. 8.

The terminal device may determine whether to send the first request based on its existing configuration and/or other usage requirements. In some embodiments, the terminal device operates in the CA/DC configuration in the current network, and the terminal device may send the first request to the network device when the terminal device needs to perform some operations in other networks. These operations are, for example, operations described above such as receiving paging, measurement, and the like. For example, the terminal device may request the network device to replace the carrier through the first request when switching from the network 1 to the network 2 to receive paging. In some embodiments, the terminal device may send the first request to the network device when it needs to perform a relay task under the indication of the current network.

It can be seen from FIG. 6 that the terminal device may suggest the network device to reconfigure the operating frequency domain unit corresponding to the first radio frequency circuit through the first request. In actual operation, there may be other alternative carriers in the current network corresponding to the first radio frequency circuit. If the network device replaces the carrier for the terminal device, the terminal device may operate on the plurality of reconfigured carriers with the first radio frequency circuit, so that at least one radio frequency circuit is vacated to operate in other networks, and no GAP needs to be requested from the current network.

Further, the terminal device may suggest different configurations according to the operating frequency range of the first radio frequency circuit. Based on the different configurations, a radio frequency circuit in the idle state may be vacated in the case of ensuring the frequency domain resource of the terminal device. When the radio frequency circuit is configured to be connected to another network, a GAP may not be requested from the current network, thereby avoiding the problem describe above. The radio frequency circuit may also perform other tasks without affecting the current communication of the terminal device, thereby improving the utilization rate of the radio frequency circuit of the terminal device.

When the terminal device requests to reconfigure the working frequency domain unit corresponding to the terminal device, the request may be performed in units of a specified frequency domain unit, and the terminal device may also suggest the network device to perform reconfiguration of the operating frequency domain unit in an implicit manner. The implicit manner is, for example, requesting through a cell group corresponding to the terminal device.

In some embodiments, the specified frequency domain unit may include one or more of a sub-band in a carrier, a carrier, a carrier combination, and a band. That is, a configuration unit that performs the reconfiguration request in the operating frequency domain of the terminal device may be the sub-band, the carrier, the carrier combination, or the band.

As an example, the specified frequency domain unit is the sub-band in the carrier. The terminal device requests to reconfigure the operating frequency domain unit in units of the sub-band. For example, the terminal device may request the network device to release a portion of the sub-band in the carrier according to the operating range of the radio frequency circuit. The first information may be configured to suggest one or more sub-bands desired to be released to the network device.

As an example, the specified frequency domain unit is the carrier, which is described in the above in combination with various configurations, and thus details are not described herein again.

As an example, the specified frequency domain unit is the carrier combination. The terminal device may request to reconfigure the operating frequency domain unit in units of the carrier combination. For example, the terminal device may combine a plurality of carriers based on a band where the plurality of carriers are currently located. That is, the first information may be configured to suggest one or more carrier combinations desired to be added, released, or activated directly to the network device.

As an example, the specified frequency domain unit may be the band. The terminal device may suggest, to the network device, a serial number of a band desired to be added or released, so as to request to reconfigure the operating frequency domain unit in units of the band. For example, when the terminal device requests the network device to release the operating frequency domain unit through the first information, the terminal device may request in units of the band.

As a possible implementation, the terminal device may also suggest a carrier desired to be reconfigured to the network device through the band. Taking the deletion of the operating frequency domain unit as an example, the terminal device may request to release a carrier of a band X. The network device may infer, according to the first information, which carriers that have been configured belong to the band X, so as to know that the terminal device may request to release in one or more manners.

In some embodiments, the terminal device may request the network device to reconfigure the operating frequency domain unit in units of a cell group. The cell group includes two types, i.e., a primary cell group and a secondary cell group (SCG). For example, the terminal device may suggest to the network device, in the first information, a carrier requested to be released through SCG. The network device may infer which carriers belong to the SCG by itself, thereby releasing these carriers.

As a possible implementation, when the terminal device requests to add or release one cell group, cells in the cell group may be maintained by the same network device. From a perspective of the frequency domain, a plurality of cells corresponding to the same network device may belong to the same band. That is, carriers corresponding to all cells under the same network device may be in the FR1 or in the FR2. For example, when a cell group A is released, a network device corresponding to the cell group A is a base station A, and carriers corresponding to the cell group A are all in the FR2. When the terminal device requests to release the cell group A, it may refer to releasing all cells corresponding to the terminal device in the base station A, and may also refer to releasing cells corresponding to the carriers in the FR2.

The foregoing describes the configuration modes and configuration units of the terminal device requesting the network device to reconfigure the operating frequency domain unit in the embodiments of the present disclosure. In some scenarios, when the terminal device determines the operating frequency domain unit that needs to be reconfigured according to the operating frequency range of the first radio frequency circuit, frequency points of some of the frequency domain units may be inconvenient to be released or deactivated. For example, the terminal device may find that a frequency point where a primary cell (Pcell) is located is inconvenient to be released. However, other carriers in the network may also be used as the primary cell from the perspective of the radio frequency circuit. In this scenario, the terminal device may also request the network device to replace the primary cell through the first request.

As an example, the first request is used to request the network device to replace a first primary cell corresponding to the terminal device with a second primary cell. The first primary cell is associated with the operating frequency domain unit of which the terminal device requests the reconfiguration. For example, the operating frequency domain unit that the terminal device needs to release or deactivate is a frequency domain unit corresponding to the first primary cell. If deletion is directly performed, there may be a problem of connection between the terminal device and the network, and therefore, the primary cell needs to be replaced first. The following describes in detail with reference to FIG. 8.

In some embodiments, whether the second primary cell selected by the terminal device is suitable for serving as the primary cell or not needs to be confirmed by the network device. Generally, when the network device selects the primary cell, not only whether the frequency point where the carrier is located is beneficial to the radio frequency implementation of the terminal device is considered, but also the signal quality of the carrier measured by the terminal device needs to be considered. Therefore, even if the condition for measuring and reporting the signal quality is not satisfied, the terminal device may also report measurement results, so that the network device decides which operating frequency domain unit is selected as a new primary cell.

As a possible implementation, the terminal device may send the assistance information to the network device. The assistance information may be configured to assist the network device in determining whether to replace the primary cell of the terminal device. In one implementation, the assistance information may be related to the second primary cell. The network device may determine, according to related information, whether to replace the first primary cell corresponding to the terminal device with the second primary cell in the first request. In one implementation, the assistance information may include signal quality measured by the terminal device. The network device may determine, according to the specific signal quality, whether to replace the first primary cell corresponding to the terminal device with the second primary cell. For example, the assistance information is related to a measurement result of the RRM.

In the above description, the terminal device may request the network device to reconfigure the operating frequency domain unit through the first information, but the final decision is made by the network device. In order to facilitate the decision of the network device on whether to perform the reconfiguration, the terminal device may send second information to assist the network device in making a decision. For example, the second information may be used for the network device to decide to add/activate/release/deactivate the operating frequency domain unit of the terminal device, or may be used for the network device to decide whether to replace the primary cell corresponding to the terminal device. For example, the second information may be used for the network device to decide whether to add a cell or a sub-band. For another example, the second information may be used for the network device to decide whether to replace the first primary cell of the terminal device with the second primary cell.

The terminal device may send the second information in various manners. In some embodiments, the terminal device sends the second information through the first request. That is, the second information is related to the first request. In some embodiments, the terminal device triggers reporting of the second information through the first request.

As an example, the first request includes the second information. That is, the terminal device may send the second information to the network device by sending the first request. As a possible implementation, the terminal device may add a measurement result of the signal in the first request through the second information. For example, the terminal device adds the RRM measurement result in the first request.

As an example, the terminal device triggers the reporting of the second information through the sending of the first request. Based on the trigger by the first request, the second information related to the measurement result may be generated and reported. For example, the terminal device may trigger RRM measurement reporting when sending the first request to separately generate a measurement reporting RRC message.

In some embodiments, the second information may assist the network device in making a decision by associating a plurality of pieces of information. For example, the second information may include the above assistance information assisting the network device to determine whether to replace the primary cell. For another example, the second information is related to the measurement result of the RRM.

In the above description, the terminal device sends the first request to the network device. The first request may be sent in a variety of signaling or manners. For example, the first request may send the first request through RRC signaling. For another example, the first request may send the first request through a medium access control control element (MAC CE).

In some embodiments, the terminal device may request to replace the operating frequency domain unit to the network device corresponding to the current network through RRC signaling. Further, the terminal device may send the first request by using the assistance information in the RRC signaling. The assistance information is, for example, "UEAssistanceInformation". That is to say, the terminal device may request the network device to replace the carrier through the assistance information "UEAssistanceInformation".

As an example, the terminal device adds the RRM measurement result to a "UEAssistanceInformation" message for the network device to configure a new primary cell for the terminal device. Alternatively, the terminal device may also trigger the RRM measurement reporting when sending the UEAssistanceInformation message to separately generate the measurement reporting RRC message.

In some embodiments, the terminal device may request the network device to reconfigure the operating frequency domain unit through the MAC CE. For example, the terminal device may request the network device to release the carrier through the MAC CE.

When the terminal device requests for one or more operating frequency domain units to be reconfigured, the MAC CE may indicate one or more operating frequency domain units corresponding to the terminal device in a plurality of manners. As an example, the MAC CE may indicate the operating frequency domain unit requested to be reconfigured by means of a bitmap. For example, the MAC CE may request, through bit positions therein, the network device to add or which cells.

Taking the carrier as an example, the MAC CE may indicate, through the bitmap, a plurality of carriers that the terminal device requests to reconfigure. Specifically, each carrier that has been configured corresponds to one bit in the bitmap. Each carrier may correspond to the bit in a certain order. As an example, the order is related to a cell identity (ID) or a carrier frequency point.

As an example, each carrier may correspond to a bit in the bitmap according to a cell ID (cell idx). For example, a carrier with a lowest cell idx corresponds to a lowest bit in the bitmap, and a carrier with a highest cell idx corresponds to a highest bit in the bitmap. For another example, the carrier with the lowest cell idx corresponds to the highest bit in the bitmap, and the carrier with the highest cell idx corresponds to the lowest bit in the bitmap.

For example, each carrier may correspond to a bit in a bitmap according to a frequency point of each carrier. For example, a carrier with a lowest frequency point corresponds to the lowest bit in the bitmap, and a carrier with a highest frequency point corresponds to the highest bit in the bitmap. For another example, the carrier with the lowest frequency point corresponds to the highest bit in the bitmap, and the carrier with the highest frequency point corresponds to the lowest bit in the bitmap.

When the terminal device sends the first request through the MAC CE, the terminal device may identify the MAC CE to the network device. As a possible implementation, the MAC CE for requesting reconfiguration may be indicated by using a logical channel (LCH) ID. For example, when the MAC CE is configured to request the network device to release/deactivate/add/activate one or more cells, the MAC CE may be identified by the LCH ID. In some scenarios, an extended LCH ID may also be used to identify the MAC CE for requesting reconfiguration.

When the terminal device requests to reconfigure the operating frequency domain unit, the terminal device may indicate the reason for the requesting at the same time, or may not indicate the reason. The indication of the reason may facilitate the network device to determine different configurations based on the reason for the requesting. In some embodiments, the terminal device may indicate the reason for requesting the reconfiguration to the network device through the first request. That is, the first request is further configured to indicate the reason why the terminal device requests the network device to perform the reconfiguration. For example, the first request may indicate that the terminal device requests the network device to perform reconfiguration of the operating frequency domain unit based on radio frequency unit adjustment. For example, the first request may directly represent the reason for requesting the reconfiguration is "radio frequency unit adjustment". For another example, the reason indicated by the terminal device to the base station for requesting to deactivate the SCG may be "multi-card, and the radio frequency circuit needs to be vacated for another network", rather than low volume of uplink data. For still another example, when the terminal device requests the base station to replace the carrier, it may indicate that "the reason for requesting to replace is the multi-card" at the same time.

After sending the first request to the network device, the terminal device may wait for feedback of the network device. If the network device finds that reconfiguration cannot be performed according to the first request, the network device may send feedback, or may not send feedback. For example, when the network device finds that the resource of the operating frequency domain unit that the terminal device requests to add is occupied, the network device may be not able to perform the reconfiguration.

If the network device reports that it cannot perform the configuration, the terminal device may request other configurations. If the network device has no feedback, the terminal device needs to determine when to re-initiate a request for reconfiguration. In some embodiments, after sending the first request, the terminal device may determine whether to re-initiate a request related to the operating frequency domain unit corresponding to the terminal device based on a first time threshold. For example, after sending the first request, the terminal device may request the network device to replace the operating frequency domain unit again if the waiting time exceeds the first time threshold, and the terminal device cannot request the network device to replace the operating frequency domain unit again if the waiting time is less than or equal to the first time threshold.

As a possible implementation, the first time threshold may be a duration. A value of the duration may be configured by the network device or may be pre-configured.

The terminal device may determine when to initiate the request again based on a timing device. For example, the terminal device starts the timing device after sending the first request, and the timing device may be configured to determine whether the terminal device can re-initiate a request related to the operating frequency domain unit corresponding to the terminal device. For example, after the terminal device requests the network device to replace the carrier and sends a message, a timer is started. Before the timer expires, the terminal device cannot request the network device to replace the carrier again.

As a possible implementation, parameters set in the timing device may be configured by the network device or may be or pre-configured. For example, the network device may configure a value of the timer.

In conjunction with FIG. 6, a method for a terminal device requesting a network device to reconfigure an operating frequency domain unit according to an embodiment of the present disclosure is introduced. For ease of understanding, possible implementations of the method are specifically described below with reference to FIG. 7 and FIG. 8. The operating frequency domain unit corresponding to the terminal device is the carrier.

Figure 7:
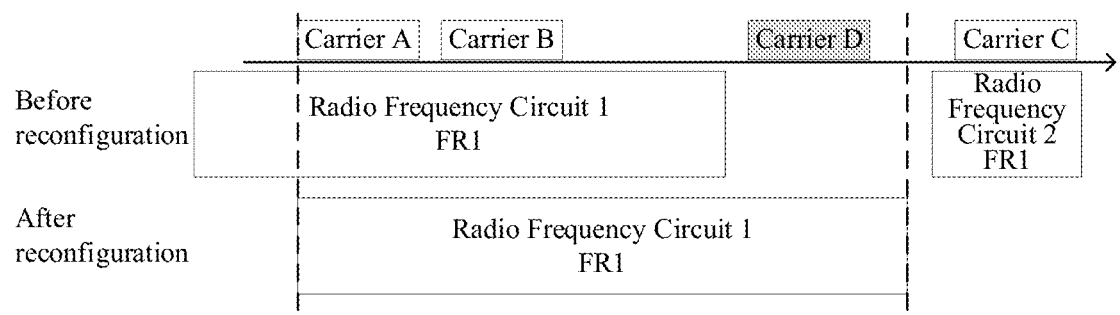
FIG. 7 shows a schematic diagram of a possible implementation of the method shown in FIG. 6.

FIG. 7 is a schematic diagram of an implementation according to an embodiment of the present disclosure. Referring to FIG. 7, before reconfiguration, the network device configures a carrier A, a carrier B and a carrier C in the FR1 for the terminal device. The terminal device uses the radio frequency circuit 1 to support the carrier A and the carrier B and the radio frequency circuit 2 to support the carrier C. As shown in FIG. 7, the utilization rate of the radio frequency circuit 1 is not high, and the radio frequency circuit 2 is occupied. The terminal device wishes to vacate the radio frequency circuit 2 to perform other operations.

The terminal device measures and finds that the signal quality of the carrier D in FIG. 7 is also good, so that the terminal device sends a first request to the network device for requesting the network device to reconfigure the carrier. In the first request, the terminal device wishes to reconfigure the carrier C to the carrier D, so that the carriers A, B, and D are covered with one radio frequency circuit and the radio frequency circuit 2 is vacated. That is, the terminal device may explicitly indicate in the first information of adding the carrier D and releasing the carrier C.

As shown in FIG. 7, after the reconfiguration by the network device, the radio frequency circuit 1 of the terminal device may operate on the carriers A, B, and D, and the frequency domain resource of the terminal device in the current network is ensured.

Compared with FIG. 5, the radio frequency circuit 2 does not need to support the carrier C. That is, after the reconfiguration, the carrier configured in the terminal device does not include the carrier C, and the radio frequency circuit 2 in an idle state. Therefore, the radio frequency circuit 2 may perform operations such as receiving paging and measurement in other networks, and there is no need to request a GAP from a network corresponding to the radio frequency circuit 1.

Figure 8:
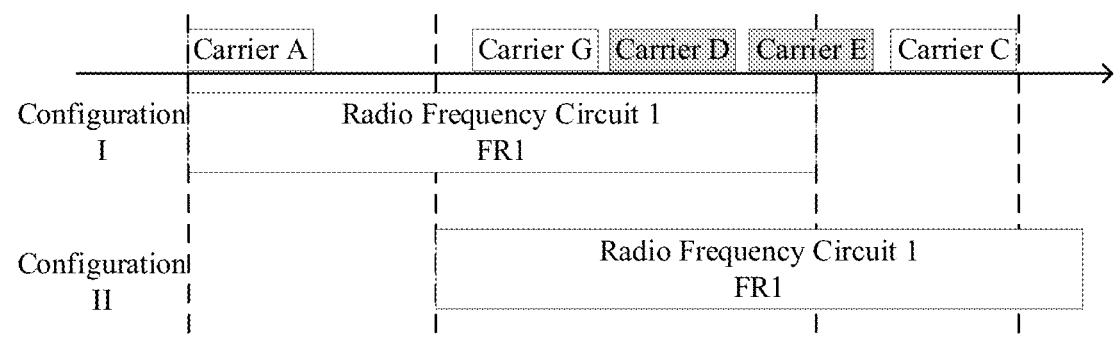
FIG. 8 shows another schematic diagram of a possible implementation of the method shown in FIG. 6.

FIG. 8 is a schematic diagram of another implementation according to an embodiment of the present disclosure. In the above description, the terminal device may simultaneously suggest the operating frequency domain unit desired to be added and the operating frequency domain unit desired to be released. The added operating frequency domain unit and the released operating frequency domain unit may be determined according to an operating frequency range corresponding to the first radio frequency circuit. As shown in FIG. 8, the network device configures three carriers for the terminal device in the FR1, which are respectively a carrier A, a carrier G, and a carrier C. The radio frequency circuit 1 may have two support modes by adjusting the operating frequency range. In configuration I, the radio frequency circuit 1 supports the carrier A and the carrier G. In configuration II, the radio frequency circuit 1 supports the carrier G and the carrier C. That is, the radio frequency circuit 1 cannot cover the three carriers at the same time.

The terminal device determines that the signal quality of the carrier D and the signal quality of the carrier E are also good by measuring or otherwise, and the terminal device may request reconfiguration from the network device. However, the configuration suggestion of the terminal device in the first request needs to consider the operating frequency range of the radio frequency circuit 1. Referring to locations of frequency points of each carrier in FIG. 8, the terminal device may simultaneously cover carriers A, G, and D, or simultaneously cover carriers G, D, E, and C. Therefore, if the carrier C is released, only the carrier D can be added, and the carrier E cannot be added. If the carrier A is released, the carrier D or the carrier E can be added.

In this case, the terminal device may report three suggestions for changing the carrier through the first request.

In a first suggestion, the carrier C is released, and the carrier D is added.

In a second suggestion, the carrier A is released, and the carrier D is added.

In a third suggestion, the carrier A is released, and the carrier E is added.

In the above description, if the terminal device finds that the frequency point where the primary cell is located is inconvenient to be released and other frequency points are relatively appropriate, the terminal device may request the network device to replace the primary cell. Referring to FIG. 8, if the carrier A is used as the primary cell of the terminal device and the carriers C and G are configured at the same time, the terminal device cannot directly adopt the second and third suggestions mode described above. In this case, the terminal device may request to replace the carrier G with a new primary cell, so that the carrier A may be released, and the carrier D or the carrier E may be added, so as to vacate a radio frequency circuit for other networks or performing other operations.

With reference to FIG. 6 to FIG. 8, the terminal device may suggest the network device to release the operating frequency domain unit corresponding to the current network, or add the operating frequency domain unit, or activate the operating frequency domain unit, or deactivate the operating frequency domain unit, thereby achieving the purpose of adjusting the radio frequency circuit and vacating at least one radio frequency circuit for other networks or performing other operations.

The method embodiments of the present disclosure are described in detail above with reference to FIG. 1 to FIG. 8. Apparatus embodiments of the present disclosure are described in detail below with reference to FIG. 9 and FIG. 10. It should be understood that the description of the apparatus embodiment corresponds to the description of the method embodiment, and therefore, parts which are not described in detail may refer to the above method embodiments.

Figure 9:
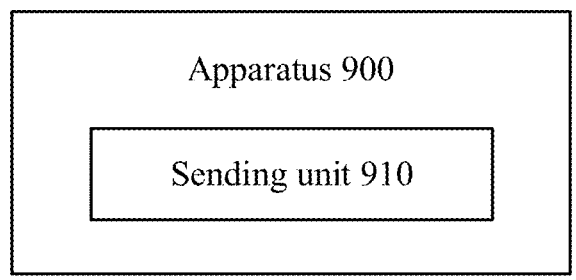
FIG. 9 shows a schematic structural diagram of a device for wireless communication according to an embodiment of the present disclosure.

FIG. 9 is a schematic block diagram of an apparatus for wireless communication according to an embodiment of the present disclosure. The apparatus may be any one of the terminal devices described above. The apparatus 900 shown in FIG. 9 includes a sending unit 910.

The sending unit 910 is configured to send a first request. The first request is used to request a network device to reconfigure an operating frequency domain unit corresponding to the terminal device. The first request includes first information, and the first information includes one or more of the following configurations: adding at least one operating frequency domain unit, activating at least one operating frequency domain unit, deactivating at least one operating frequency domain unit, and releasing at least one operating frequency domain unit.

Optionally, the first request is used for indicating the operating frequency domain unit requested to be reconfigured by the terminal device, and the operating frequency domain unit requested to be reconfigured is related to the operating frequency range corresponding to the first radio frequency circuit of the terminal device.

Optionally, the first request is used to indicate the operating frequency domain unit requested to be reconfigured by the terminal device, and the operating frequency domain unit requested to be reconfigured is related to an operating frequency range corresponding to a first radio frequency circuit of the terminal device.

Optionally, the first radio frequency circuit is one of a plurality of radio frequency circuits, and the first radio frequency circuit is determined based on operating frequency ranges corresponding to the plurality of radio frequency circuits.

Optionally, the first information includes adding the at least one operating frequency domain unit and releasing the at least one operating frequency domain unit, and the at least one operating frequency domain unit requested to be added and the at least one operating frequency domain unit requested to be released in the first information correspond to a same band.

Optionally, the first information includes adding the at least one operating frequency domain unit and activating the at least one operating frequency domain unit, and the at least one operating frequency domain unit requested to be activated in the first information is part or all of the at least one operating frequency domain unit requested to be added.

Optionally, the terminal device requests the network device to perform reconfiguration of the operating frequency domain unit based on at least one of a specified frequency domain unit and a cell group corresponding to the terminal device.

Optionally, the specified frequency domain unit includes the specified frequency domain unit includes at least one of a sub-band in a carrier, a carrier, a carrier combination, and a band.

Optionally, the first request further includes second information, and the second information is related to a measurement result of radio resource management, RRM.

Optionally, the first request is sent through at least one of radio resource control, RRC, signaling, a media access control element, MAC CE.

Optionally, the first request is sent through assistance information in the RRC signaling.

Optionally, the terminal device corresponds to at least one operating frequency domain unit, the first request is sent through the MAC CE, and the MAC CE indicates, through a bitmap, the at least one operating frequency domain unit that the terminal device requests to reconfigure.

Optionally, the first request is sent through the MAC CE, and the MAC CE indicates through a logical channel ID.

Optionally, the first request is further used to indicate that the terminal device requests the network device to reconfigure the operating frequency domain unit based on adjustment of a radio frequency unit.

Optionally, the apparatus 900 further includes a determining unit, and the determining unit is configured to determine whether to re-initiate a request related to the operating frequency domain unit corresponding to the terminal device based on a first time threshold.

Optionally, the terminal device supports a multi-card technology.

Figure 10:
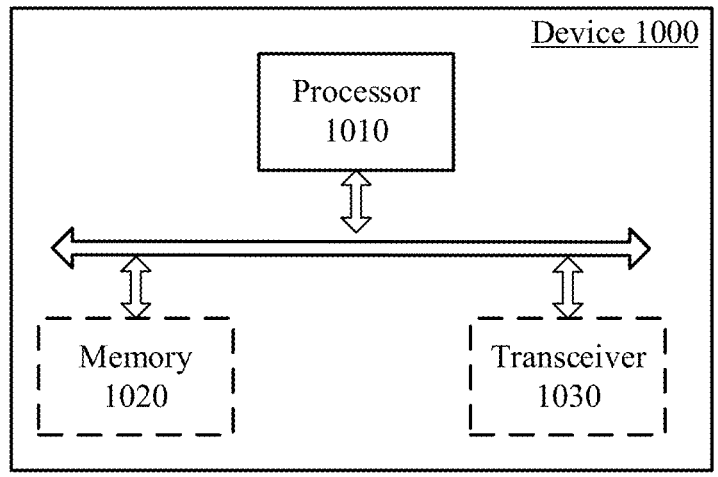
FIG. 10 shows a schematic structural diagram of a communication device according to an embodiment of the present disclosure.

FIG. 10 is a schematic structural diagram of a communication device according to an embodiment of the present disclosure. Dash lines in FIG. 10 indicate that the units or modules are optional. The device 1000 is configured to perform the method described in the above method embodiments. The device 1000 may be a chip or a terminal device.

The device 1000 may include one or more processors 1010 supporting the device 1000 to implement the method described in the above method embodiments. The processor 1010 may be a general purpose processor or a dedicated processor. For example, the processor may be a central processing unit (CPU). Alternatively, the processor may be another general purpose processor, a digital signal processor (DSP), an application specific integrated circuit (ASIC), a field programmable gate array (FPGA), or other programmable logic devices, a discrete gate or a transistor logic device, a discrete hardware component, and the like. The general purpose processor may be a microprocessor or the processor may be any conventional processor or the like.

The device 1000 further includes one or more memories 1020 storing a program, and the program is executed by the processor 1010 to enable the processor 1010 to perform the method described in the above method embodiments. The memory 1020 may be independent of the processor 1010 or integrated in the processor 1010.

The device 1000 further includes a transceiver 1030. The processor 1010 communicates with other devices or chips through the transceiver 1030. For example, the processor 1010 performs data transceiving with other devices or chips through the transceiver 1030.

Embodiments of the present disclosure further provide a computer-readable storage medium storing a program. The computer-readable storage medium may be applied to a terminal or a network device provided in the embodiments of the present disclosure, and the program enables the computer to perform the method executed by the terminal or the network device in the embodiments of the present disclosure.

It should be understood that the computer-readable storage medium mentioned in the embodiments of the present disclosure may be any usable medium that can be read by a computer, or a data storage device such as a server or a data center integrated with one or more usable media. The usable medium may be a magnetic medium (for example, a floppy disk, a hard disk, or a magnetic tape), an optical medium (for example, a digital video disc (DVD)) or a semiconductor medium (for example, a solid state disk (SSD)), or the like.

Embodiments of the present disclosure further provide a computer program product. The computer program product includes a program. The computer program product may be applied to the terminal or the network device provided in the embodiments of the present disclosure, and the program enables the computer to perform the method executed by the terminal or the network device in the embodiments of the present disclosure.

All or some of the above embodiments may be implemented by software, hardware, firmware, or any combination thereof. When implemented using software, all or some of the above embodiments may be implemented in the form of the computer program product. The computer program product includes one or more computer instructions. When the computer program instructions are loaded and executed on a computer, the processes or functions according to the embodiments of the present disclosure are all or partially generated. The computer may be a general purpose computer, a dedicated computer, a computer network, or other programmable devices. The computer instructions may be stored in a computer-readable storage medium or transmitted from one computer-readable storage medium to another computer-readable storage medium. For example, the computer instructions may be transmitted from one website site, computer, server or data center to another website site, computer, server, or data center in a wired manner (e.g., a coaxial cable, optical fiber, digital subscriber line (DSL)) or wireless manner (e.g., infrared, wireless, microwave, etc.).

Embodiments of the present disclosure further provide a computer program. The computer program may be applied in the terminal or the network device provided in the embodiments of the present disclosure, and the computer program enables the computer to perform the method executed by the terminal or the network device in the embodiments of the present disclosure.

The terms "system" and "network" in the present disclosure may be used interchangeably. In addition, the terms in the present disclosure are only used to explain specific embodiments of the present disclosure, but are not intended to limit the present disclosure. The terms "first", "second", "third", "fourth" and the like in the specification and claims of the present disclosure and the accompanying drawings are used to distinguish different objects, and are not used to describe a specific order. Furthermore, the terms "including" and "having" and any variations thereof are intended to cover non-exclusive inclusion.

In the embodiments of the present disclosure, the mentioned "indication" may be a direct indication, an indirect indication, or a representation having an association relationship. For example, A indicates B, which may represent that A directly indicates B, e.g., B is obtained by A. It may also represent that A indirectly indicates B, e.g., A indicates C, and B is obtained by C. It may also represent that there is an association relationship between A and B.

In the embodiments of the present disclosure, the term "corresponding" may indicate that there is a direct correspondence or indirect correspondence between the two, and may also indicate that there is an association relationship between the two, or may be a relationship such as indicating, indicated, configuring, configured, etc.

In the embodiments of the present disclosure, the "pre-configuration" may be implemented by pre-storing corresponding codes, tables, or other manners that may be used to indicate related information in a device (for example, including a terminal device and a network device), and the present disclosure is not limited in the specific implementations thereof.

In the embodiments of the present disclosure, the "protocol" may refer to a standard protocol in the field of communications, for example, may include an LTE protocol, an NR protocol, and a related protocol applied to a future communication system, which is not limited in the present disclosure.

In the embodiments of the present disclosure, determining B according to A does not mean that B is determined only according to A, and B may also be determined according to A and/or other information.

In the embodiments of the present disclosure, the term "and/or" is merely an association relationship describing an associated object, and indicates that there may be three relationships, for example, A and/or B may indicate that A exists alone, A and B exist at the same time, and B exists alone. In addition, the character "/" in this specification generally indicates that the associated objects are in a "or" relationship.

In various embodiments of the present disclosure, the sequence numbers of the processes above does not mean the order of execution. The order of execution of each process should be determined by its function and internal logic, and should not constitute any limitation on the implementation process of the embodiments of the present disclosure.

In the several embodiments provided in the present disclosure, it should be understood that the disclosed system, device, and method may be implemented in other manners. For example, the device embodiments described above are merely illustrative. For example, the division of the units is merely a logical function division, and there may be another division manner during actual implementation, for example, a plurality of units or components may be combined or may be integrated into another system, or some features may be ignored or not performed. Besides, the displayed or discussed mutual coupling, direct coupling or communication connection may be indirect coupling or communication connection through some interfaces, devices, or units, and may be electrical, mechanical, or in other forms.

The units described as separate components may or may not be physically separate, and components displayed as units may or may not be physical units, that is, may be located in one place, or may be distributed on a plurality of network units. Some or all of the units may be selected according to actual needs to achieve the objectives of the solutions in the embodiments.

In addition, functional units in the embodiments of the present disclosure may be integrated into one processing unit, or each of the units may exist alone physically, or two or more units may be integrated into one unit.

The above description is merely specific embodiments of the present disclosure, and the protection scope of the present disclosure is not limited thereto. Any person skilled in the art could easily conceive of changes or replacements within the technical scope disclosed in the present disclosure, which should be covered by the protection scope of the present disclosure. Therefore, the protection scope of the present disclosure shall be subject to the protection scope of the claims.

What is claimed is:

1. A method for wireless communication, comprising:
    determining, by a terminal device that supports a multiple subscriber identity module (SIM) card technology, that a reconfiguration for an operating frequency domain unit corresponding to a first SIM card is needed based on an operation associated with a second SIM card; and
    in response to the determining, sending, by a terminal device, a first request by using radio resource control (RRC) signaling, wherein the first request comprises a request for a first network device associated with the first SIM card to reconfigure the operating frequency domain unit corresponding to the first SIM, wherein the first request indicates that the request for the first network device to reconfigure the operating frequency domain unit is for multiple SIM operation, wherein the first request represents an operating range of a first radio frequency circuit of the terminal device, wherein the first request is sent through RRC signaling UEAssistanceInformation;
    wherein the first request sent by the terminal device includes first information, and the first information includes a request of releasing at least one operating frequency domain unit.

2. The method according to claim 1, wherein the first radio frequency circuit is one of a plurality of radio frequency circuits, and the first radio frequency circuit is determined based on operating frequency ranges corresponding to the plurality of radio frequency circuits.

3. The method according to claim 1, wherein the first information includes a request of adding a first operating frequency domain unit and releasing a second operating frequency domain unit, and the first operating frequency domain unit requested to be added and the second operating frequency domain unit requested to be released in the first information correspond to a same band.

4. The method according to claim 1, wherein the first information includes a request of adding a first operating frequency domain unit and activating a second operating frequency domain unit, and the second operating frequency domain unit requested to be activated in the first information is at least part of the first operating frequency domain unit requested to be added.

5. The method according to claim 1, wherein the operating frequency domain unit are in a specified frequency domain unit that include at least one of a sub-band in a carrier, a carrier, a carrier combination, a secondary cell, a cell group, a secondary cell group, or a band.

6. The method according to claim 1, wherein the first request further includes second information, and the second information is generated based on a measurement result of radio resource management (RRM).

7. The method according to claim 1, wherein the terminal device corresponds to at least one operating frequency domain unit that the terminal device requests to reconfigure.

8. The method according to claim 1, wherein the first request indicates that the terminal device requests the first network device to reconfigure the operating frequency domain unit based on adjustment of a radio frequency unit.

9. The method according to claim 1, wherein after the terminal device sends the first request, the method further comprises:
    determining, by the terminal device, whether to re-initiate a request related to the operating frequency domain unit corresponding to the terminal device based on a first time threshold.

10. The method according to claim 9, wherein the first time threshold is configured by the first network device.

11. The method according to claim 1, wherein the at least one operating frequency domain unit comprises a primary cell or a secondary cell, or a frequency domain resource that the terminal device operates in.

12. The method according to claim 1, wherein the at least one operating frequency domain unit comprises a carrier, a sub-band in a carrier, a carrier combination, or a band.

13. A terminal device, comprising:
    at least one processor;
    one or more non-transitory computer-readable storage media coupled to the at least one processor and storing programming instructions for execution by the at least one processor, wherein the programming instructions, when executed, cause the terminal device to perform operations comprising:
    determining that a reconfiguration for an operating frequency domain unit corresponding to a first SIM card is needed based on an operation associated with a second SIM card; and
    in response to the determining, sending a first request by using radio resource control (RRC) signaling, wherein the first request comprises a request for a first network device associated with the first SIM card to reconfigure the operating frequency domain unit corresponding to the first SIM, wherein the first request indicates that the request for the first network device to reconfigure the operating frequency domain unit is for multiple SIM operation, wherein the first request represents an operating range of a first radio frequency circuit of the terminal device, wherein the first request is sent through RRC signaling UEAssistanceInformation;
    wherein the first request sent by the terminal device includes first information, and the first information includes a request of releasing at least one operating frequency domain unit.

14. A chip, comprising:
    at least one processor configured to execute instructions to cause a terminal device to perform operations comprising:
    determining that a reconfiguration for an operating frequency domain unit corresponding to a first SIM card is needed based on an operation associated with a second SIM card; and
    in response to the determining, sending a first request by using radio resource control (RRC) signaling, wherein the terminal device supports a multiple subscriber identity module (SIM) card technology, wherein the first request comprises a request for a first network device associated with the first SIM card to reconfigure the operating frequency domain unit corresponding to the first SIM the terminal device, wherein the first request indicates that the request for the first network device to reconfigure the operating frequency domain unit is for multiple SIM operation, wherein the first request represents an operating range of a first radio frequency circuit of the terminal device, wherein the first request is sent through RRC signaling UEAssistanceInformation;
    wherein the first request sent by the terminal device includes first information, and the first information includes a request of releasing at least one operating frequency domain unit.

15. The terminal device according to claim 14, wherein the first radio frequency circuit is one of a plurality of radio frequency circuits, and the first radio frequency circuit is determined based on operating frequency ranges corresponding to the plurality of radio frequency circuits.

16. The terminal device according to claim 13, wherein the first information includes adding a first operating frequency domain unit and releasing a second operating frequency domain unit, and the first operating frequency domain unit requested to be added and the second operating frequency domain unit requested to be released in the first information correspond to a same band.

17. The terminal device according to claim 13, wherein the first information includes a request of adding a first operating frequency domain unit and activating a second operating frequency domain unit, and the second operating frequency domain unit requested to be activated in the first information is at least part of the first operating frequency domain unit requested to be added.

* * * * *